US010445911B2

(12) United States Patent
Sakai

(10) Patent No.: US 10,445,911 B2
(45) Date of Patent: Oct. 15, 2019

(54) DISPLAY CONTROL METHOD AND DISPLAY CONTROL DEVICE

(71) Applicant: FUJITSU LIMITED, Kawasaki-shi, Kanagawa (JP)

(72) Inventor: Takafumi Sakai, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 31 days.

(21) Appl. No.: 15/581,274

(22) Filed: Apr. 28, 2017

(65) Prior Publication Data

US 2017/0345197 A1 Nov. 30, 2017

(30) Foreign Application Priority Data

May 25, 2016 (JP) .................................. 2016-104192

(51) Int. Cl.
*G06T 11/60* (2006.01)
*G09G 5/38* (2006.01)
*G06F 3/147* (2006.01)
*G06T 11/00* (2006.01)

(52) U.S. Cl.
CPC .............. *G06T 11/60* (2013.01); *G06F 3/147* (2013.01); *G06T 11/00* (2013.01); *G09G 5/38* (2013.01); *G09G 2340/0464* (2013.01); *G09G 2340/0492* (2013.01); *G09G 2340/12* (2013.01); *G09G 2340/145* (2013.01)

(58) Field of Classification Search
None
See application file for complete search history.

(56) References Cited

U.S. PATENT DOCUMENTS 9,213,185 B1* 12/2015 Starner .............. G02B 27/017
2016/0133051 A1* 5/2016 Aonuma .............. G06T 19/006
345/633

FOREIGN PATENT DOCUMENTS

JP 2012-198668 10/2012

OTHER PUBLICATIONS

Steven J. Henderson, et al. "Evaluating the Benefits of Augmented Reality for Task Localization in Maintenance of an Armored Personnel Carrier Turret", 10$^{th}$ International Symposium on Mixed and Augmented Reality (ISMAR 2009), https://www.youtube.com/watch?v=mn-zvymlSvk, 2 pages.

* cited by examiner

*Primary Examiner* — YuJang Tswei
(74) *Attorney, Agent, or Firm* — Xsensus LLP

(57) ABSTRACT

A method includes specifying object data and an arrangement position of the object data which is arranged outside an area corresponding to a position and an orientation of a terminal device, by referring to correspondence information of the object data and the arrangement position of the object data, specifying a direction of the arrangement position relative to the terminal device based on the arrangement position, the position of the terminal device, and the orientation of the terminal device, and displaying the object data in a region corresponding to the direction within a display area of a display provided in the terminal device.

12 Claims, 13 Drawing Sheets

FIG. 3

| OBJECT ID | OBJECT DATA | POSITIONAL INFORMATION |
|---|---|---|
| AR001 | AR-DATA001.dat | E135.xx,N35.yy,EL+30.zz |
| AR002 | AR-DATA002.dat | E135.xx,N35.yy,EL+30.zz |
| ... | ... | ... |

121

DISPLAY CONTROL METHOD AND DISPLAY CONTROL DEVICE

CROSS-REFERENCE TO RELATED APPLICATION

This application is based upon and claims the benefit of priority of the prior Japanese Patent Application No. 2016-104192, filed on May 25, 2016, the entire contents of which are incorporated herein by reference.

FIELD

The embodiments discussed herein are related to display control.

BACKGROUND

In recent years, there has been proposed an augmented reality (AR) technology in which object data is displayed in a superimposed manner on a captured image by using a terminal such as a smartphone. In this AR technology, for example, when an image is captured with the terminal oriented toward an object, object data is displayed in a superimposed manner on the captured image based on information on the position and orientation of the terminal and a marker contained in the captured image. Further, there has been proposed a technology in which a plurality of pieces of object data are displayed so as not to overlap each other.

The related art is disclosed in, for example, Japanese Laid-open Patent Publication No. 2012-198668.

SUMMARY

According to an aspect of the invention, a method includes specifying object data and an arrangement position of the object data which is arranged outside an area corresponding to a position and an orientation of a terminal device, by referring to correspondence information of the object data and the arrangement position of the object data, specifying a direction of the arrangement position relative to the terminal device based on the arrangement position, the position of the terminal device, and the orientation of the terminal device, and displaying the object data in a region corresponding to the direction within a display area of a display provided in the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of an object data storage unit;

DESCRIPTION OF EMBODIMENTS

When the display position of object data is located within a captured image, the object data is displayed in a superimposed manner on the captured image. For example, when the terminal oriented toward the object returns to a normal operation position, the object data is not displayed. For this reason, it is difficult to grasp the position of the object data in the case of the normal operation position of the terminal.

In one aspect, the embodiments discussed herein are aimed at allowing a user to easily grasp the position of object data.

A display control program, a display control method, and a display control device according to the embodiments discussed herein are described below in detail with reference to the drawings. Note that the disclosed technologies are not limited to the embodiments. The embodiments described below may be combined with each other as appropriate without contradiction.

First Embodiment

Figure 1:
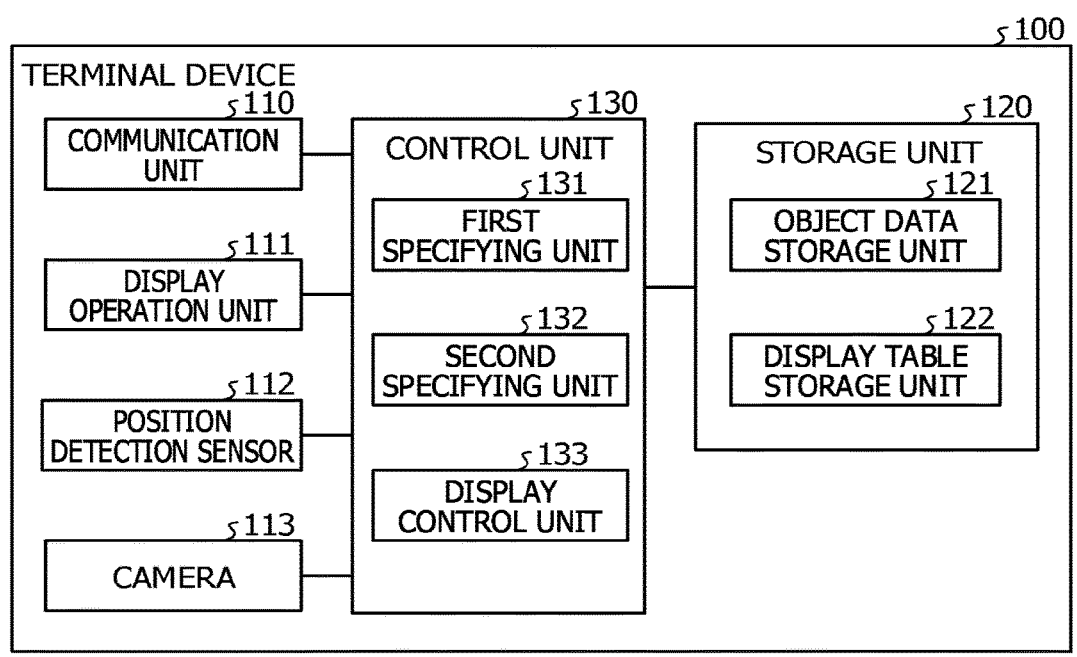
FIG. 1 is a block diagram illustrating an example of the configuration of a terminal device of a first embodiment.

FIG. 1 is a block diagram illustrating an example of the configuration of a terminal device 100 of a first embodiment. The terminal device 100 illustrated in FIG. 1 is, for example, an information processing device that is operable while being held by a hand of a user, and a mobile communication terminal such as a tablet terminal or a smartphone may be used. In the following description, the terminal device 100 may be referred to simply as a terminal.

The terminal device 100 causes a display unit to display object data associated with a position within an area corresponding to the position and orientation of the terminal device 100. Specifically, the terminal device 100 refers to a storage unit that stores pieces of object data and positions in association with each other, and specifies a piece of object data associated with a position outside the area and a position associated with the object data. The terminal device 100 specifies a direction to the position associated with the specified object data relative to the terminal device 100 based on the position associated with the specified object data and the position and orientation of the terminal device 100. The terminal device 100 displays the specified object data in a region corresponding to the specified direction within the display area of the display unit. Thus, the position of the object data may easily be grasped on the terminal device 100.

Figure 2A:
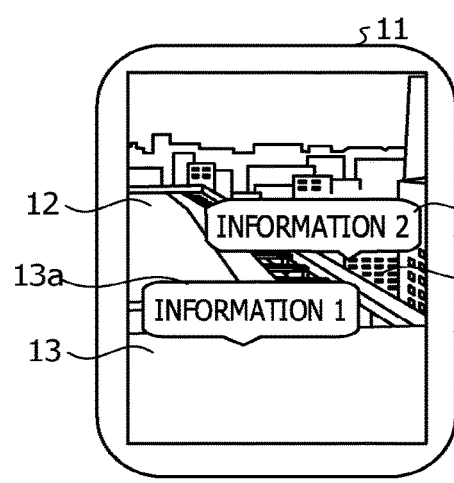
FIGS. 2A and 2B are diagrams illustrating an example of superimposed display of object data.
Figure 2B:
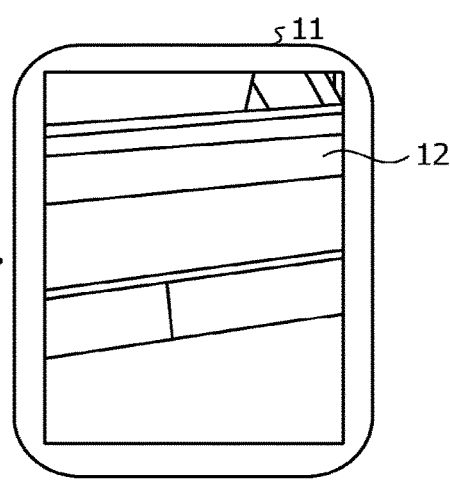

Related-art superimposed display of object data is described with reference to FIGS. 2A and 2B. FIGS. 2A and 2B are diagrams illustrating an example of the superimposed display of object data. FIG. 2A illustrates a state in which a captured image of a town is displayed as an object on a display operation unit 12 of a terminal 11 such as a smartphone and AR contents are displayed as object data in a superimposed manner. At this time, on the captured image, an AR content 13a is displayed in a superimposed manner over a building 13 and an AR content 14a is displayed in a superimposed manner over a building 14.

FIG. 2B illustrates a state in which the terminal 11 in the state of FIG. 2A returns to a normal operation position and an object below the terminal 11 is captured. The AR contents 13a and 14a that have been displayed in a superimposed manner in FIG. 2A are not displayed in FIG. 2B because both the buildings 13 and 14 are located outside the image capture range. That is, the user has difficulty in grasping the positions of the AR contents 13a and 14a in the case of the normal operation position of the terminal 11.

As illustrated in FIG. 1, the terminal device 100 includes a communication unit 110, a display operation unit 111, a position detection sensor 112, a camera 113, a storage unit 120, and a control unit 130. In addition to the functional units illustrated in FIG. 1, the terminal device 100 may include various functional units of a known computer, such as various input devices and audio output devices.

The communication unit 110 is implemented by, for example, a mobile phone line such as a third-generation mobile communication system or Long Term Evolution (LTE), or a communication module such as a wireless local area network (LAN). The communication unit 110 is a communication interface connected to a server device (not illustrated) via a network to control communications of information with the server device. The communication unit 110 receives object data to be used for superimposed display from the server device. The communication unit 110 outputs the received object data to the control unit 130.

The display operation unit 111 is a display device configured to display various kinds of information and is also an input device configured to receive various kinds of operation from the user. For example, the display operation unit 111 is implemented by a liquid crystal display as the display device. For example, the display operation unit 111 is also implemented by a touch panel as the input device. That is, the display device and the input device are integrated into the display operation unit 111. The display operation unit 111 outputs an operation input by the user to the control unit 130 as operation information.

The position detection sensor 112 is a sensor configured to detect the position and orientation of the terminal device 100. The position detection sensor 112 includes, for example, a global positioning system (GPS) receiver configured to detect the position of the terminal device 100 and an acceleration sensor, a gyro sensor, and an azimuth sensor configured to detect the orientation of the terminal device 100. The position detection sensor 112 generates positional information containing a longitude, a latitude, and an altitude based on a GPS signal received by the GPS receiver. The position detection sensor 112 detects the orientation of the terminal device 100 by using the acceleration sensor, the gyro sensor, and the azimuth sensor and generates directional information based on information on the detected orientation. When a detection instruction is input from the control unit 130, the position detection sensor 112 starts generating the positional information and the directional information. For example, a three-axis acceleration sensor such as a piezoresistive sensor or a capacitive sensor may be used as the acceleration sensor. For example, a vibratory gyro sensor may be used as the gyro sensor. For example, a magnetic sensor may be used as the azimuth sensor. The position detection sensor 112 outputs the generated positional information and the generated directional information to the control unit 130. The position detection sensor 112 may be any sensor adaptable to other positioning systems.

The camera 113 is an example of an image capture device and is provided on, for example, the back surface of the terminal device 100, that is, the surface opposite the display operation unit 111 to capture images of surrounding environments. The camera 113 captures images by using, for example, a complementary metal oxide semiconductor (CMOS) image sensor or a charge coupled device (CCD) image sensor as an image capture element. The camera 113 generates an image by performing photoelectric conversion of light that is received by the image capture element and then analog/digital (A/D) conversion of a signal generated by the photoelectric conversion. The camera 113 outputs the generated image to the control unit 130.

The storage unit 120 is implemented by a storage device typified by a semiconductor memory element such as a random access memory (RAM) or a flash memory. The storage unit 120 includes an object data storage unit 121 and a display table storage unit 122. The storage unit 120 stores information to be used for processing performed by the control unit 130.

The object data storage unit 121 stores object data acquired from the server device. FIG. 3 is a diagram illustrating an example of the object data storage unit 121. As illustrated in FIG. 3, the object data storage unit 121 includes items of "object ID (identifier)", "object data", and "positional information". For example, the object data storage unit 121 stores one record for each object data. The object data to be stored in the object data storage unit 121 is acquired from the server device (not illustrated) in advance.

The "object ID" is an identifier that identifies object data, that is, AR content. The "object data" is information indicating object data acquired from the server device. The "object data" is, for example, a data file that constitutes object data, that is, AR content. The "positional information" is positional information associated with object data. The "positional information" is information indicating positional information of the associated object data in the world coordinate system.

Figure 4:
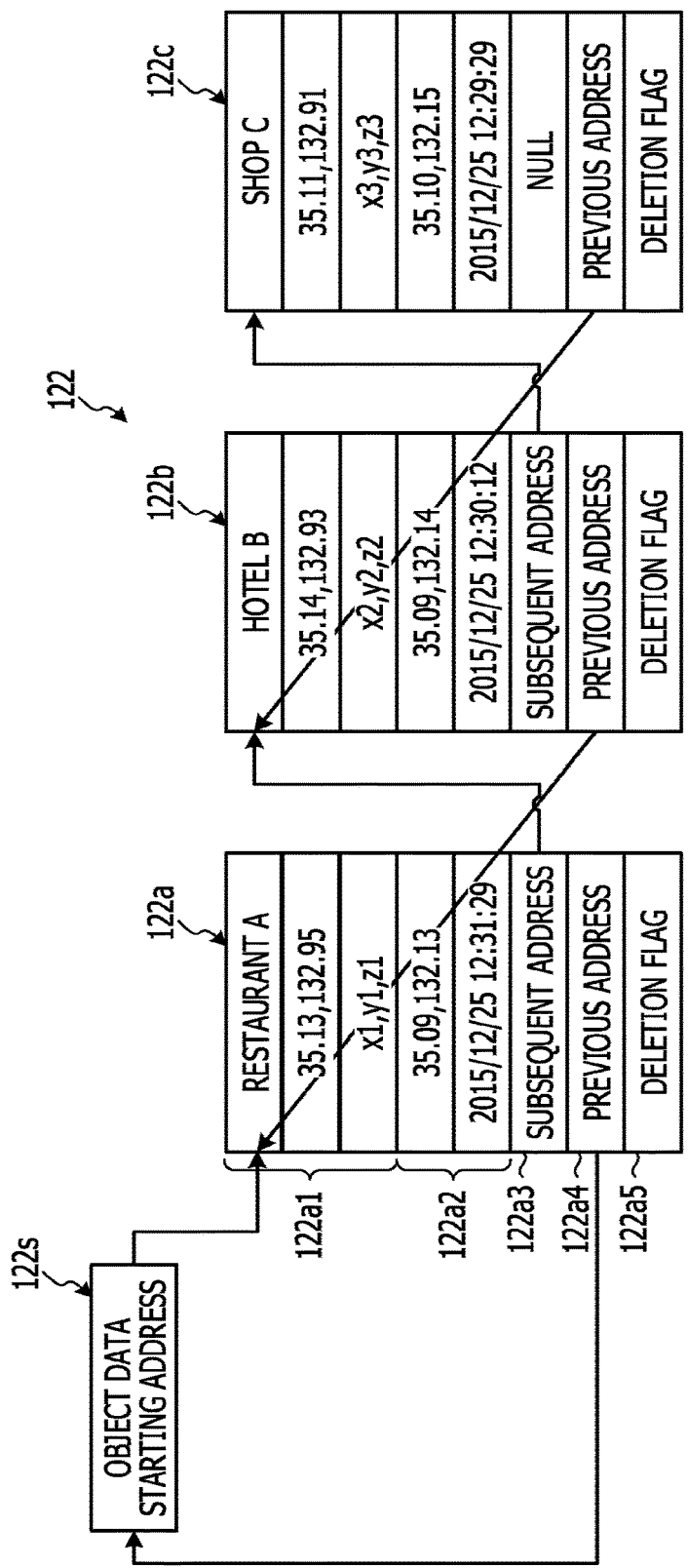
FIG. 4 is a diagram illustrating an example of a display table storage unit.

The display table storage unit 122 stores a display table in which object data is associated with a position and a time at which the object data is displayed for the first time. FIG. 4 is a diagram illustrating an example of the display table storage unit 122. As illustrated in FIG. 4, the display table storage unit 122 includes, as the display table, a queue that stores a starting address 122s of object data and pieces of data 122a, 122b, and 122c corresponding to respective pieces of object data. In FIG. 4, the data 122a is described as an example and description of the data 122b and the data 122c is omitted because the data 122b and the data 122c each have a structure similar to that of the data 122a.

The data 122a includes an item 122a1 that stores information regarding an object, and an item 122a2 that stores a position and a time at which object data is displayed for the first time. Further, the data 122a includes a subsequent address 122a3 indicating an address of a subsequent record, a previous address 122a4 indicating previous data or the starting address 122s, and a deletion flag 122a5 to be set when the user has deleted displayed object data.

The item 122a1 contains, for example, a name of an object that is present at a position associated with object data, positional information indicating the position associated with the object data, and coordinates in a virtual space where the object data is displayed in a superimposed manner. For example, the item 122a1 indicates that an object having a name "Restaurant A" is located at "35.13° north and 132.95° east" and object data corresponding to "Restaurant A" is associated with coordinates "x1, y1, z1" in the virtual space. The coordinates in the virtual space are coordinates defined in a display area (hereinafter referred to also as an area) which is displayed on the display operation unit 111, that is, where the object data is displayed.

The item 122a2 contains a position and a time at which the object data is displayed for the first time. The item 122a2 is information to be used for determining whether to terminate the object data display, for example, because the user has moved from the position at which the object data was displayed for the first time. That is, the item 122a2 is information to be used for determining whether to delete the data 122a from the queue.

The control unit 130 is implemented in such a manner that a program stored in an internal storage device is executed by, for example, a central processing unit (CPU) or a micro processing unit (MPU) while using a RAM as a work area. The control unit 130 may be implemented by an integrated circuit such as an application specific integrated circuit (ASIC) or a field programmable gate array (FPGA). The control unit 130 includes a first specifying unit 131, a second specifying unit 132, and a display control unit 133 to implement or execute information processing functions and operations described below. The internal configuration of the control unit 130 is not limited to the configuration illustrated in FIG. 1 and another configuration may be employed as long as the information processing described below is executed.

When an AR application is activated, the first specifying unit 131 outputs a detection instruction to the position detection sensor 112. In response to the detection instruction, positional information and directional information are input from the position detection sensor 112 to the first specifying unit 131. That is, the first specifying unit 131 starts acquiring the position and orientation of the terminal device 100. When the positional information and the directional information are input, the first specifying unit 131 refers to the object data storage unit 121 and specifies object data having positional information within a range of a predetermined distance based on the input positional information. The first specifying unit 131 outputs an object ID of the specified object data, the positional information, and the directional information to the display control unit 133.

The first specifying unit 131 specifies not only object data located at a position within the area displayed on the display operation unit 111 but also object data located at a position outside the area. Specifically, the first specifying unit 131 refers to the object data storage unit 121 that stores pieces of object data and positions in association with each other, and specifies a piece of object data associated with a position outside the area and a position associated with the object data.

The first specifying unit 131 determines whether the movement amount of the terminal device 100 is equal to or larger than a predetermined amount or whether a predetermined period of time has elapsed. When the movement amount of the terminal device 100 is equal to or larger than the predetermined amount or the predetermined period of time has elapsed, the first specifying unit 131 initializes the display table stored in the display table storage unit 122. This case corresponds to, for example, a case in which the user has moved or is not operating the terminal device 100. The predetermined period of time may be set arbitrarily to, for example, five minutes.

Area information indicating a range of the area that is the display area is input from the display control unit 133 to the first specifying unit 131. When the movement amount of the terminal device 100 is smaller than the predetermined amount or the predetermined period of time has not elapsed, the first specifying unit 131 determines, based on the area information, whether object data which is not present in the display table is located outside the area as a result of the movement of the terminal device 100. When the object data which is not present in the display table is not located outside the area, the first specifying unit 131 continues to determine whether the movement amount of the terminal device 100 is equal to or larger than the predetermined amount or whether the predetermined period of time has elapsed.

When the object data which is not present in the display table is located outside the area, the first specifying unit 131 stores information on the object data located outside the area in the display table of the display table storage unit 122. Further, the first specifying unit 131 determines whether object data which is newly located within the area is present as a result of the movement of the terminal device 100. When the object data which is newly located within the area is present, the first specifying unit 131 outputs an object ID of the object data to the display control unit 133 and extra-area information to the second specifying unit 132. When the object data which is newly located within the area is not present, the first specifying unit 131 outputs the extra-area information to the second specifying unit 132.

The first specifying unit 131 determines, based on the area information, whether object data which is present in the display table is located within the area as a result of the movement of the terminal device 100. When the object data which is present in the display table is located within the area, the first specifying unit 131 outputs, to the display control unit 133, display information indicating that the object data is to be displayed again. When the object data which is present in the display table is not located within the area, the first specifying unit 131 outputs, to the display control unit 133, display information indicating that there is no object data to be displayed again.

The extra-area information is input from the first specifying unit 131 to the second specifying unit 132 and the area information is input from the display control unit 133 to the second specifying unit 132. When the extra-area information is input from the first specifying unit 131, the second specifying unit 132 acquires information on the object data located outside the area from the display table of the display table storage unit 122. The second specifying unit 132 specifies, in the area that is the display area of the display operation unit 111, a direction to the position of the object data located outside the area based on the area information and the acquired information on the object data located outside the area. That is, the second specifying unit 132 specifies a direction to the position associated with the specified object data relative to the terminal device 100 based on the position associated with the specified object data and the position and orientation of the terminal device 100. The second specifying unit 132 outputs, to the display control unit 133, coordinates within the display area, that is, within the area corresponding to the specified direction.

Figure 5:
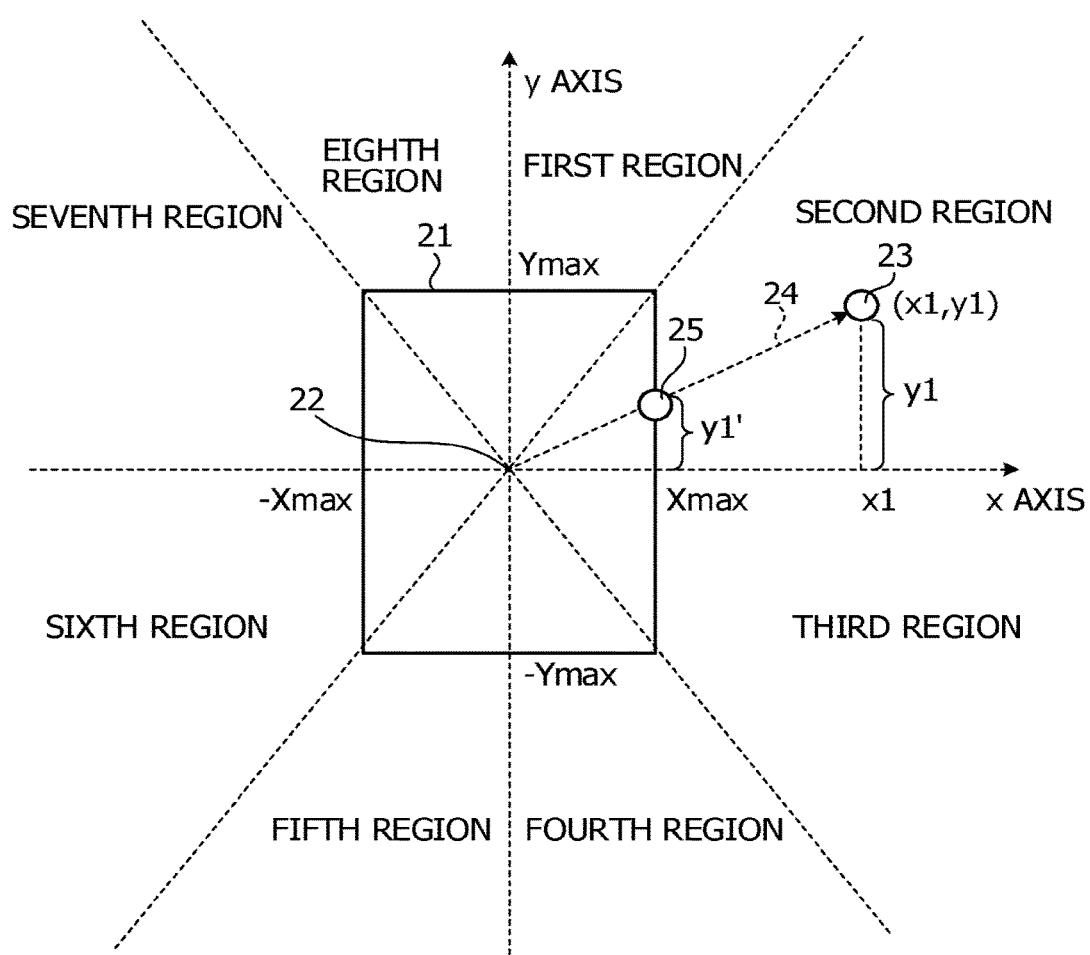
FIG. 5 is a diagram illustrating an example of a relationship between the position and direction of object data and the display position thereof in a display area.

Calculation of the coordinates within the area is described with reference to FIG. 5. FIG. 5 is a diagram illustrating an example of a relationship between the position and direction of object data and the display position thereof in the display area. The area is set by the display control unit 133 and the description is made under the assumption that the area has already been set. In the example of FIG. 5, two-dimensional coordinates are set with respect to the origin defined at a center 22 of a display area 21, that is, an area. The second specifying unit 132 divides the region outside the area into eight regions by an x axis, a y axis, and diagonal lines that extend through the center 22. The second specifying unit 132 calculates, in each divided region, an intersection between a line segment extending through the center 22 from the position of the object data located outside the area and a boundary line of the area, that is, an outer frame of the screen of the display area 21.

For example, when a position 23 of the object data located outside the area is present in the second region, the second specifying unit 132 draws a line segment 24 connecting the center 22 to coordinates (x1, y1) of the position 23 of the object data located outside the area. The second specifying unit 132 calculates an intersection 25 between the line segment 24 and the boundary line of the area. Specifically, when it is assumed that y≤Ymax/Xmax, y≥0, and x Xmax in the second region, the second specifying unit 132 calculates y1' of the intersection 25 as expressed by y1'=Xmax×y1/x1 because y1':y1=Xmax:x1. That is, the coordinates of the intersection 25, which are the coordinates within the area corresponding to the position 23 of the object data located outside the area, are (Xmax, y1'). The coordinates within the area may be three-dimensional coordinates instead of two-dimensional coordinates.

Description is made again with reference to FIG. 1. When the AR application is activated, the display control unit 133 starts acquiring a captured image from the camera 113. The object ID, the positional information, and the directional information are input from the first specifying unit 131 to the display control unit 133. The display control unit 133 sets the area that is the display area based on the input positional information and the input directional information and outputs the set area to the first specifying unit 131 as the area information.

When the area is set, the display control unit 133 refers to the object data storage unit 121 and starts displaying object data located within the area in a superimposed manner on the captured image based on the input object ID. When the coordinates within the area are input from the second specifying unit 132, the display control unit 133 displays object data located outside the area in a superimposed manner in a region corresponding to the specified direction within the display area (within the area).

When the object data located outside the area is being displayed in a superimposed manner in the region corresponding to the specified direction, the display control unit 133 determines whether an operation to delete the object data is received. Examples of the operation to delete the object data include a flicking operation that causes the object data to move out of the screen. When the operation to delete the object data is received, the display control unit 133 deletes the object data from the display area. Further, the display control unit 133 sets a deletion flag for the corresponding data in the display table of the display table storage unit 122. When the operation to delete the object data is not received, the display control unit 133 does not set the deletion flag.

When the display information indicating that the object data is to be displayed again is input from the first specifying unit 131, the display control unit 133 refers to the display table storage unit 122 and displays the object data located within the area in a superimposed manner on the captured image. At this time, as the object data within the area which is displayed in a superimposed manner on the captured image, the display control unit 133 selects object data whose deletion flag is not set in the information on the object data that is stored in the display table. That is, the display control unit 133 does not display again object data which is subjected to the deletion operation by the user.

When the display information indicating that there is no object data to be displayed again is input from the first specifying unit 131 and when any object data is being displayed currently, the display control unit 133 continues to display the object data in a superimposed manner on the captured image. When the processing for the display information is completed, the display control unit 133 determines whether a termination instruction is received from the user. When the termination instruction is not received, the display control unit 133 instructs the first specifying unit 131 so as to continue to perform the display control processing. When the termination instruction is received, the display control unit 133 terminates the display control processing.

When the termination instruction is received or the AR application is stopped, the display control unit 133 clears the display table of the display table storage unit 122. The display control unit 133 may clear the display table of the display table storage unit 122 when the user has moved, for example, into a building from the place where the superimposed display was being performed and the GPS signal has been interrupted. The display control unit 133 may clear the display table of the display table storage unit 122, for example, when the user has deleted all the pieces of object data which were being displayed in a superimposed manner from the screen by a flicking operation. The display control unit 133 may clear the display table of the display table storage unit 122, for example, when the user has performed a shaking operation or other operations to delete all the pieces of object data which were being displayed in a superimposed manner.

Figure 6:
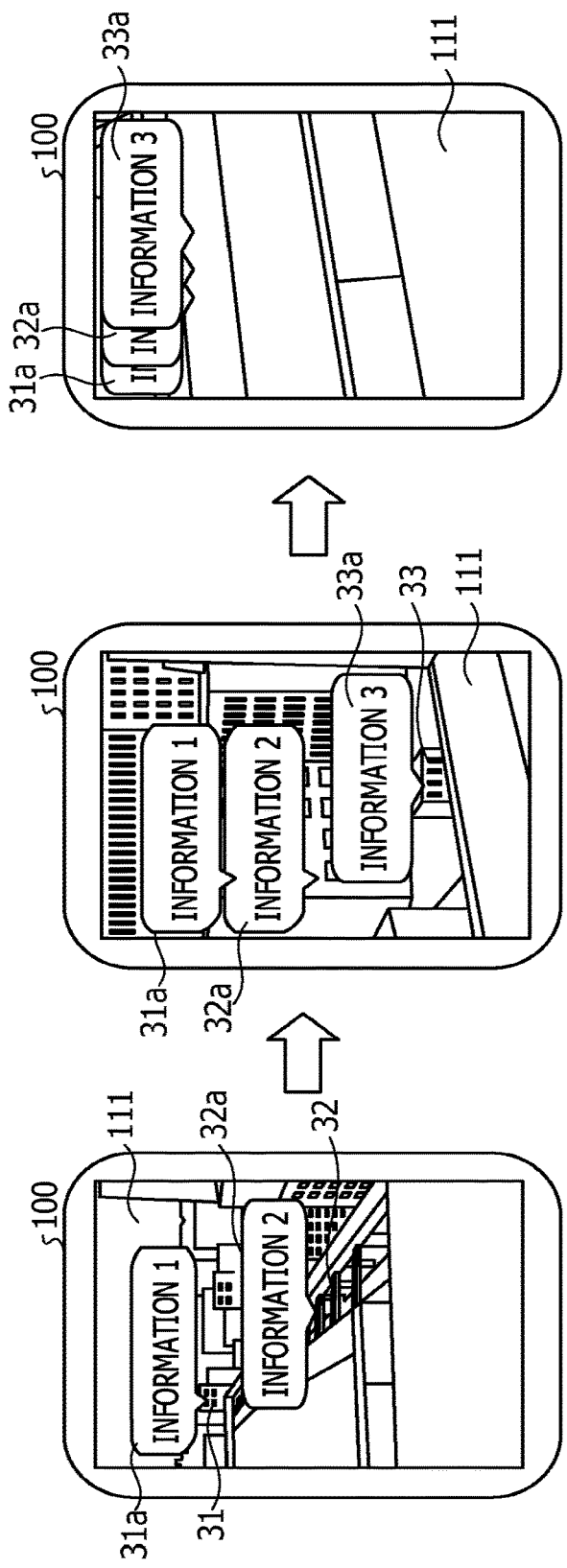
FIGS. 6A, 6B, and 6C are diagrams illustrating an example of transition of object data display.

Transition of object data display is described with reference to FIGS. 6A, 6B, 6C, 7A, 7B, and 7C. FIGS. 6A, 6B, and 6C are diagrams illustrating an example of the transition of object data display. FIG. 6A illustrates a state in which the terminal device 100 is oriented toward objects 31 and 32. At this time, a captured image containing the objects 31 and 32 is displayed on the display operation unit 111. Further, object data 31a associated with the position of the object 31 and object data 32a associated with the position of the object 32 are displayed in a superimposed manner on the captured image. In the description with reference to FIGS. 6A, 6B, 6C, 7A, 7B, and 7C, the display operation unit 111 corresponds to the area that is the display area.

FIG. 6B illustrates a state in which the user has moved the sight rightward from the state of FIG. 6A while holding the terminal device 100. At this time, the captured image displayed on the display operation unit 111 newly contains an object 33 while the objects 31 and 32 are located outside the frame. The objects 31 and 32 are located outside the frame by being shifted leftward from the display area of the display operation unit 111, and hence the pieces of object data 31a and 32a are displayed in a superimposed manner on the captured image so as to be arranged along the left boundary. That is, the pieces of object data 31a and 32a are displayed as if the pieces of object data 31a and 32a were caught at the left end of the screen. Further, object data 33a associated with the position of the object 33 that is newly contained in the captured image is displayed in a superimposed manner on the captured image.

FIG. 6C illustrates a state in which the user has moved the terminal device 100 in the state of FIG. 6B to a position where the screen close at hand is clearly visible, that is, the camera 113 is oriented toward the floor. The captured image displayed on the display operation unit 111 does not contain any object because the object 33 is located outside the frame. The pieces of object data 31a and 32a are displayed in a superimposed manner on the captured image so as to be arranged along the upper boundary from the upper left that is present in a direction corresponding to the positions of the objects 31 and 32. That is, the pieces of object data 31a and 32a are displayed as if the pieces of object data 31a and 32a were caught at the upper end in a range from the upper left end of the screen. Further, the object 33 is located outside the frame by being shifted upward from the display area of the display operation unit 111, and hence the object data 33a is displayed in a superimposed manner on the captured image so as to be arranged along the upper boundary. That is, the object data 33a is displayed as if the object data 33a were caught at the upper end of the screen. In other words, the terminal device 100 may continuously display object data of an object which is not displayed when the orientation or the like of the terminal device 100 is changed. Further, the terminal device 100 may easily estimate the original position of object data.

In the example of FIG. 6C, the pieces of object data 31a, 32a, and 33a are displayed while being slightly shifted from each other, and therefore the user may easily recognize that a plurality of pieces of object data are present. The pieces of object data which overlap each other may be moved by, for example, a user's swiping operation. The order of overlapping of the pieces of object data may be changed by, for example, displaying object data selected by a user's tapping operation on top of the screen.

Figure 7:
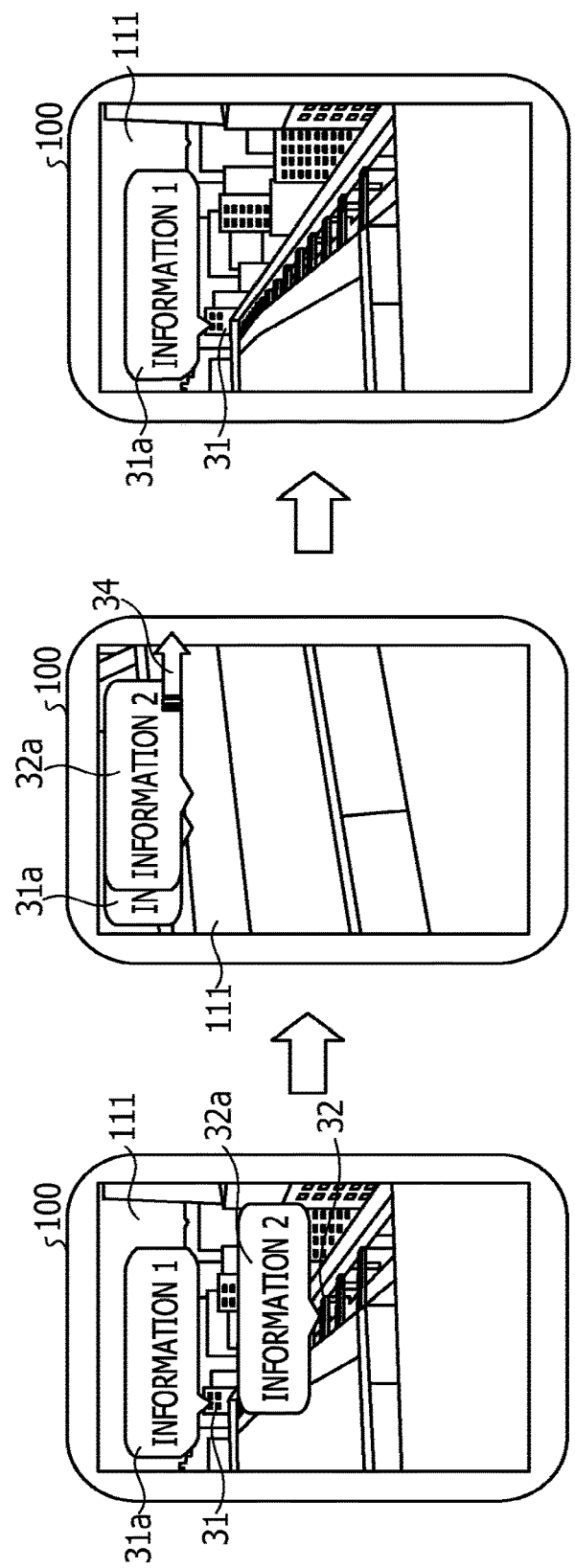
FIGS. 7A, 7B, and 7C are diagrams illustrating another example of the transition of object data display.

FIGS. 7A, 7B, and 7C are diagrams illustrating another example of the transition of object data display. Similarly to FIG. 6A, FIG. 7A illustrates a state in which the terminal device 100 is oriented toward the objects 31 and 32. At this time, a captured image containing the objects 31 and 32 is displayed on the display operation unit 111. Further, the object data 31a associated with the position of the object 31 and the object data 32a associated with the position of the object 32 are displayed in a superimposed manner on the captured image.

FIG. 7B illustrates a state in which the user has moved the terminal device 100 in the state of FIG. 7A to a position where the screen close at hand is clearly visible, that is, the camera 113 is oriented toward the floor. The captured image displayed on the display operation unit 111 does not contain any object because the objects 31 and 32 are located outside the frame. The pieces of object data 31a and 32a are displayed in a superimposed manner on the captured image so as to be arranged along the upper boundary that is present in a direction corresponding to the positions of the objects 31 and 32. That is, the pieces of object data 31a and 32a are displayed as if the pieces of object data 31a and 32a were caught at the upper end of the screen. When the object data 32a is moved out of the screen by, for example, a user's flicking operation 34 in FIG. 7B, the object data 32a displayed in a superimposed manner is deleted from the screen.

FIG. 7C illustrates a state in which the user has oriented the terminal device 100 in the state of FIG. 7B toward the objects 31 and 32 again. The captured image displayed on the display operation unit 111 contains the objects 31 and 32 again. At this time, similarly to the state of FIG. 7A, the object data 31a is displayed at the position corresponding to the object 31. That is, when the position associated with the object data is shifted into the area, the terminal device 100 displays the object data on the display operation unit 111 in the same mode as a mode in which the object data has previously been displayed.

The object data 32a has been deleted in FIG. 7B and the deletion flag of the display table has been set. Therefore, the object data 32a is not displayed in a superimposed manner even when the object 32 is contained in the captured image. Specifically, when the position associated with the object data is shifted into the area, the terminal device 100 does not display again the object data for which an instruction to terminate the displaying on the display operation unit 111 is received when the position associated with the object data is present outside the area. Thus, the terminal device 100 may display, in a superimposed manner, only object data which contains information desired by the user.

Figure 8:
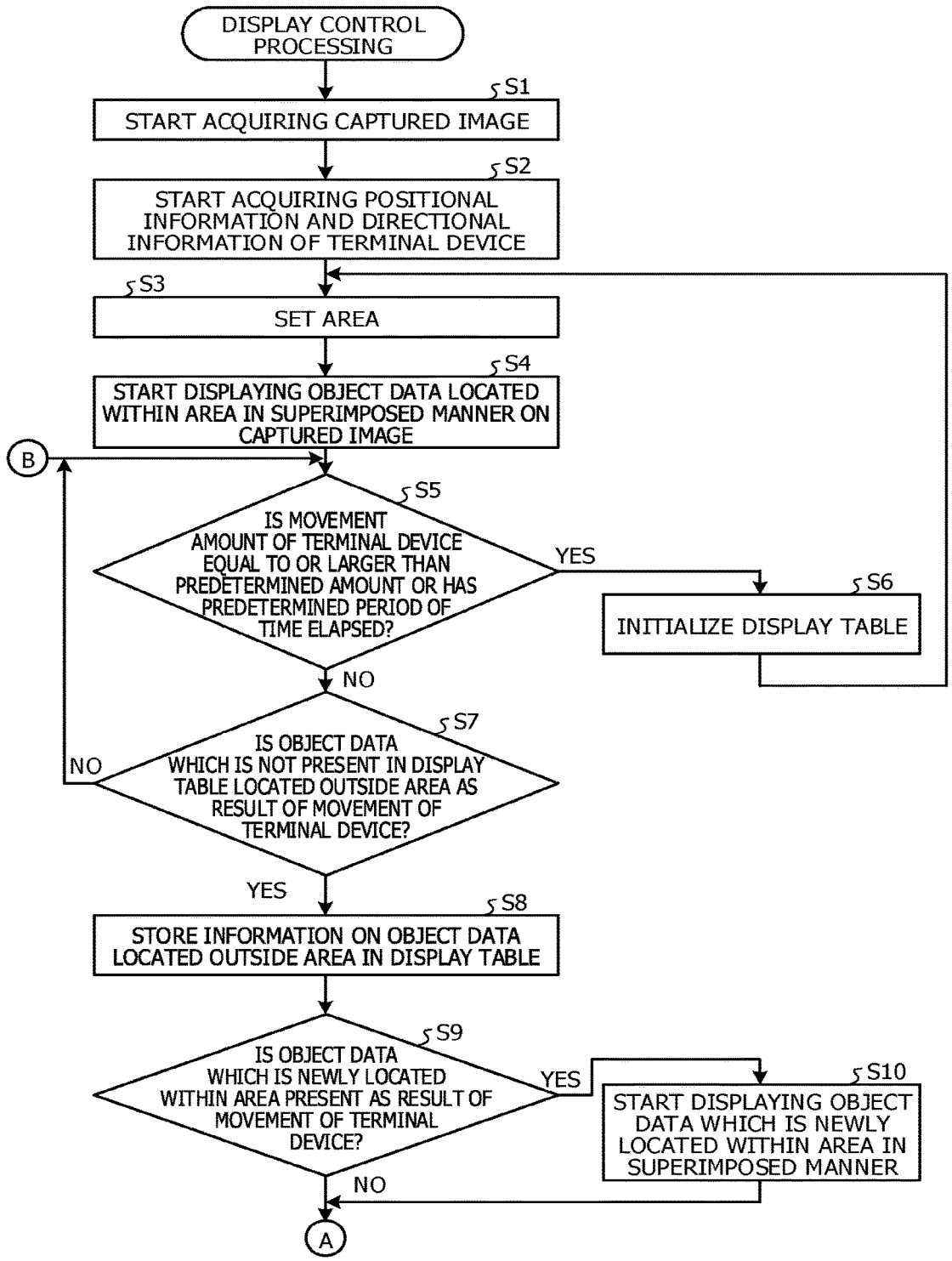
FIG. 8 is a flowchart illustrating an example of display control processing of the first embodiment.
Figure 9:
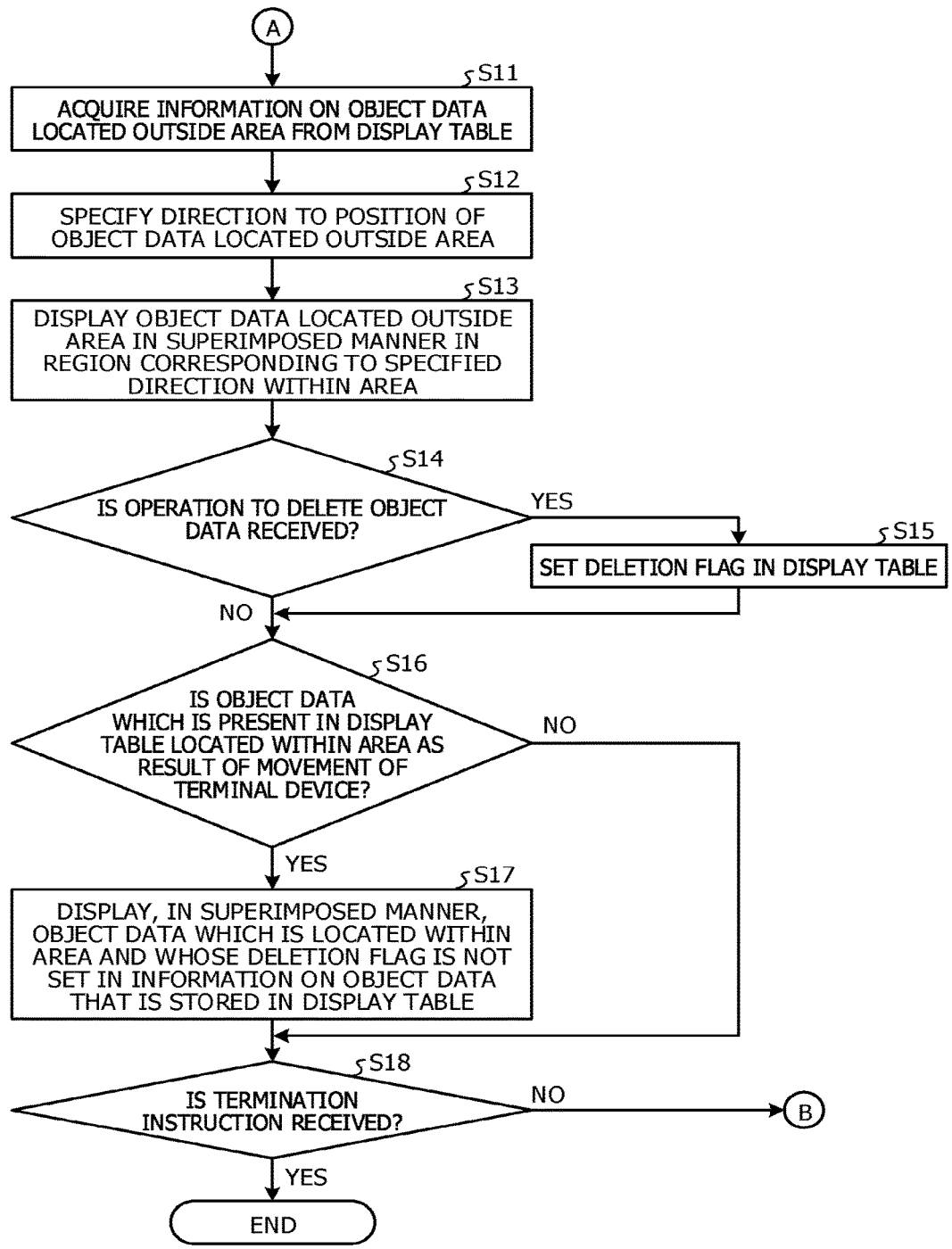
FIG. 9 is a flowchart illustrating the example of the display control processing of the first embodiment.

Next, the operation of the terminal device 100 of the first embodiment is described. FIG. 8 and FIG. 9 are flowcharts illustrating an example of the display control processing of the first embodiment.

When an AR application is activated, the display control unit 133 of the terminal device 100 starts acquiring a captured image from the camera 113 (Step S1). When the AR application is activated, the first specifying unit 131 starts acquiring positional information and directional information of the terminal device 100 by outputting a detection instruction to the position detection sensor 112 (Step S2). When the positional information and the directional information are input, the first specifying unit 131 refers to the object data storage unit 121 and specifies object data having positional information within a range of a predetermined distance based on the input positional information. The first specifying unit 131 outputs an object ID of the specified object data, the positional information, and the directional information to the display control unit 133.

The object ID, the positional information, and the directional information are input from the first specifying unit 131 to the display control unit 133. The display control unit 133 sets an area that is a display area based on the input positional information and the input directional information (Step S3) and outputs the set area to the first specifying unit 131 as area information.

When the area is set, the display control unit 133 refers to the object data storage unit 121 and starts displaying object data located within the area in a superimposed manner on the captured image based on the input object ID (Step S4).

When the user has moved the terminal device 100 afterwards, the first specifying unit 131 determines whether the movement amount of the terminal device 100 is equal to or larger than a predetermined amount or whether a predetermined period of time has elapsed (Step S5). When the movement amount of the terminal device 100 is equal to or larger than the predetermined amount or the predetermined period of time has elapsed (Step S5: Yes), the first specifying unit 131 initializes the display table stored in the display table storage unit 122 (Step S6).

When the movement amount of the terminal device 100 is smaller than the predetermined amount or the predetermined period of time has not elapsed (Step S5: No), the first specifying unit 131 determines whether object data which is not present in the display table is located outside the area as a result of the movement of the terminal device 100 (Step S7). When the object data which is not present in the display table is not located outside the area (Step S7: No), the first specifying unit 131 returns to Step S5.

When the object data which is not present in the display table is located outside the area (Step S7: Yes), the first specifying unit 131 stores information on the object data located outside the area in the display table of the display table storage unit 122 (Step S8). Further, the first specifying unit 131 determines whether object data which is newly located within the area is present as a result of the movement of the terminal device 100 (Step S9). When the object data which is newly located within the area is present (Step S9: Yes), the first specifying unit 131 outputs an object ID of the object data to the display control unit 133 and extra-area information to the second specifying unit 132. The display control unit 133 starts displaying the object data which is newly located within the area in a superimposed manner based on the input object ID (Step S10). When the object data which is newly located within the area is not present (Step S9: No), the first specifying unit 131 outputs the extra-area information to the second specifying unit 132.

When the extra-area information is input from the first specifying unit 131, the second specifying unit 132 acquires information on the object data located outside the area from the display table of the display table storage unit 122 (Step S11). The second specifying unit 132 specifies a direction to the position of the object data located outside the area based on the area information and the acquired information on the object data located outside the area (Step S12). The second specifying unit 132 outputs, to the display control unit 133, coordinates within the area corresponding to the specified direction.

When the coordinates within the area are input from the second specifying unit 132, the display control unit 133 displays the object data located outside the area in a superimposed manner in a region corresponding to the specified direction within the area (Step S13). When the object data located outside the area is being displayed in a superimposed manner in the region corresponding to the specified direction, the display control unit 133 determines whether an operation to delete the object data is received (Step S14).

When the operation to delete the object data is received (Step S14: Yes), the display control unit 133 deletes the object data from the display area. Further, the display control unit 133 sets a deletion flag for the corresponding data in the display table of the display table storage unit 122 (Step S15). When the operation to delete the object data is not received (Step S14: No), the display control unit 133 does not set the deletion flag.

When the user has moved the terminal device 100 afterwards, the first specifying unit 131 determines, based on the area information, whether object data which is present in the display table is located within the area as a result of the movement of the terminal device 100 (Step S16). When the object data which is present in the display table is located within the area (Step S16: Yes), the first specifying unit 131 outputs, to the display control unit 133, display information indicating that the object data is to be displayed again. When the object data which is present in the display table is not located within the area (Step S16: No), the first specifying unit 131 outputs, to the display control unit 133, display information indicating that there is no object data to be displayed again.

When the display information indicating that the object data is to be displayed again is input from the first specifying unit 131, the display control unit 133 displays, in a superimposed manner, object data which is located within the area and whose deletion flag is not set in the information on the object data that is stored in the display table (Step S17). When the display information indicating that there is no object data to be displayed again is input from the first specifying unit 131 and when any object data is being displayed currently, the display control unit 133 continues to display the object data in a superimposed manner on the captured image. When the processing for the display information is completed, the display control unit 133 determines whether a termination instruction is received from the user (Step S18).

When the termination instruction is not received (Step S18: No), the display control unit 133 returns to Step S5. When the termination instruction is received (Step S18: Yes), the display control unit 133 terminates the display control processing. Thus, the terminal device 100 may provide a screen which allows the user to easily grasp the position of object data. Further, the user may view the object data which has been displayed once while the terminal device 100 has been moved to a position where the user may clearly view the object data, and thus the terminal device 100 may improve visibility and operability. Still further, once unwanted object data is deleted, the terminal device 100 does not display the deleted object data when the terminal device 100 is oriented toward the same object again. Thus, the user may view only desired information left on the screen, thereby easily selecting information to be displayed. Still further, the terminal device 100 may collectively display, on a single screen, not only the object data located within the image capture range but also the object data located outside the image capture range. Thus, the clarity of information display may be improved.

As described above, the terminal device 100 causes the display operation unit 111 to display object data associated with a position within the area corresponding to the position and orientation of the terminal device 100. The terminal device 100 refers to the object data storage unit 121 that stores pieces of object data and positions in association with each other, and specifies a piece of object data associated with a position outside the area and a position associated with the object data. The terminal device 100 specifies a direction to the position associated with the specified object data relative to the terminal device 100 based on the position associated with the specified object data and the position and orientation of the terminal device 100. The terminal device 100 displays the specified object data in a region corresponding to the specified direction within the display area of the display operation unit 111. As a result, the position of the object data may easily be grasped.

The terminal device 100 acquires an image of the area that is captured by the camera 113. The terminal device 100 generates a new image by superimposing the specified object data on the acquired captured image. The terminal device 100 displays the generated new image on the display operation unit 111. As a result, the position of the object data displayed in a superimposed manner on the captured image may easily be grasped.

In the terminal device 100, the object data is object data associated with a position that has been included in the area. As a result, the object data which has been displayed in a superimposed manner once may continuously be displayed in a superimposed manner even when the area to be captured as an image is changed.

When the position associated with the object data is shifted into the area, the terminal device 100 displays the object data on the display operation unit 111 in the same mode as a mode in which the object data has previously been displayed. As a result, the object data which has been displayed in a superimposed manner once may be displayed in a superimposed manner so as to return to the position corresponding to the object data in the captured image.

When the position associated with the object data is shifted into the area, the terminal device 100 does not display again the object data for which an instruction to terminate the displaying on the display operation unit 111 is received when the position associated with the object data is present outside the area. As a result, the user may view only desired information left on the screen, thereby easily selecting information to be displayed.

Second Embodiment

Figure 10:
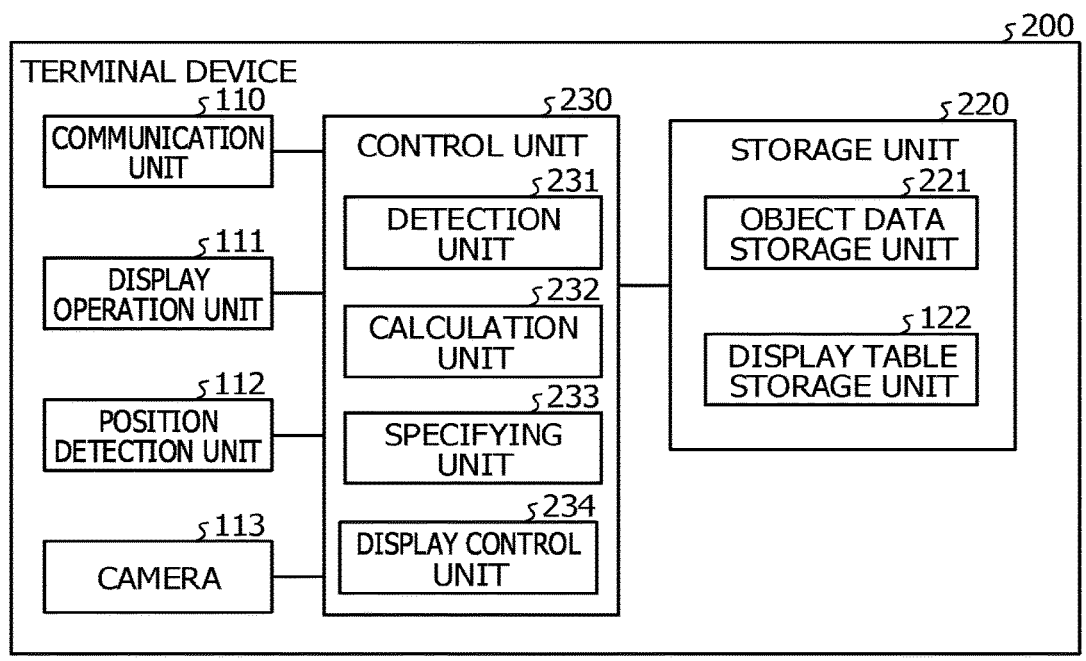
FIG. 10 is a block diagram illustrating an example of the configuration of a terminal device of a second embodiment.

In the first embodiment, the positional information is acquired by using the GPS and the superimposed display is performed based on the positional information of object data. Alternatively, the superimposed display of object data may be performed based on a reference object such as a marker. An embodiment in this case is described as a second embodiment. FIG. 10 is a block diagram illustrating an example of the configuration of a terminal device 200 of the second embodiment. The same components as those of the terminal device 100 of the first embodiment are denoted by the same reference symbols and therefore redundant description of components and operations is omitted.

A control unit 230 of the terminal device 200 of the second embodiment includes a detection unit 231 and a calculation unit 232 compared with the control unit 130 of the terminal device 100 of the first embodiment. The detection unit 231 and the calculation unit 232 correspond to the first specifying unit 131 of the first embodiment and therefore description of similar functions may be omitted. Further, the control unit 230 includes a specifying unit 233 and a display control unit 234 in place of the second specifying unit 132 and the display control unit 133 compared with the control unit 130 of the first embodiment. Similarly, the specifying unit 233 corresponds to the second specifying unit 132 of the first embodiment and therefore description of similar functions may be omitted.

A storage unit 220 of the terminal device 200 of the second embodiment includes an object data storage unit 221 in place of the object data storage unit 121 compared with the storage unit 120 of the terminal device 100 of the first embodiment. The object data storage unit 221 is different from the object data storage unit 121 only in that the object data storage unit 221 does not contain positional information of object data and therefore description thereof is omitted.

When an AR application is activated, the detection unit 231 starts acquiring a captured image from the camera 113. Further, the detection unit 231 starts acquiring positional information and directional information of the terminal device 200. When the detection unit 231 has started acquiring a captured image, the detection unit 231 starts detecting a marker from the captured image. Specifically, the detection unit 231 detects a marker, that is, a reference object corresponding to object data by analyzing the captured image. In other words, the detection unit 231 detects a reference object from an image captured by the image capture device, that is, the camera 113 provided in the terminal device 200. For example, an AR marker may be used as the marker. The detection unit 231 outputs information on the detected marker to the calculation unit 232. Further, the detection unit 231 outputs the positional information and the directional information to the calculation unit 232 and the display control unit 234.

Area information is input from the display control unit 234 to the detection unit 231. The detection unit 231 determines whether the movement amount of the terminal device 200 is equal to or larger than a predetermined amount or whether a predetermined period of time has elapsed. Further, the detection unit 231 determines whether object data which is not present in the display table is located outside the area as a result of the movement of the terminal device 200. The detection unit 231 refers to the object data storage unit 221 and determines, based on the information on the marker, whether object data which is newly located within the area is present as a result of the movement of the terminal device 200. Based on the determination, the detection unit 231 outputs an object ID to the display control unit 234 and extra-area information to the specifying unit 233. Further, the detection unit 231 determines whether object data which is present in the display table is located within the area as a result of the movement of the terminal device 200. Based on the determination, the detection unit 231 outputs display information to the display control unit 234. Each determination processing described above is similar to the processing performed by the first specifying unit 131 of the first embodiment and therefore description thereof is omitted.

When the information on the marker is input from the detection unit 231, the calculation unit 232 calculates a relative position of the detected marker to the terminal device 200 based on the information on the marker. That is, the calculation unit 232 calculates a relative position of the reference object to the terminal device 200 based on the detected reference object. The relative position is a position indicated by coordinates in the virtual space, that is, coordinates in the area. The calculation unit 232 calculates positional information in the actual space based on the calculated relative position, the positional information, and the directional information. The calculation unit 232 stores the calculated coordinates in the area and the positional information in the actual space in the display table of the display table storage unit 122. The calculation unit 232 refers to the object data storage unit 221 and acquires an object ID of the object data corresponding to the marker based on the information on the marker. The calculation unit 232 outputs the object ID and the calculated relative position to the specifying unit 233.

The extra-area information is input from the detection unit 231 to the specifying unit 233 and the area information is input from the display control unit 234 to the specifying unit 233. When the object ID and the relative position are input from the calculation unit 232, the specifying unit 233 specifies a direction to the object data corresponding to the input object ID based on the input relative position and the input area information. When the extra-area information is input from the detection unit 231, the specifying unit 233 acquires information on the object data located outside the area from the display table of the display table storage unit 122. The specifying unit 233 specifies a direction to the object data located outside the area relative to the marker based on the area information and the acquired information on the object data located outside the area. That is, when the position and orientation of the terminal device 200 are changed, the specifying unit 233 specifies a direction to the detected reference object relative to the terminal device 200 based on the calculated relative position of the reference object to the terminal device 200. The specifying unit 233 outputs, to the display control unit 234, coordinates within the display area, that is, within the area corresponding to the specified direction.

The object ID, the positional information, and the directional information are input from the detection unit 231 to the display control unit 234. The display control unit 234 sets the area that is the display area based on the input positional information and the input directional information and outputs the set area to the detection unit 231 and the specifying unit 233 as the area information.

When the area is set, the display control unit 234 refers to the object data storage unit 221 and starts displaying the object data corresponding to the marker within the area in a superimposed manner on the captured image based on the input object ID. When the coordinates within the area are input from the specifying unit 233, the display control unit 234 displays the object data located outside the area in a superimposed manner in a region corresponding to the specified direction within the display area (within the area).

When the object data located outside the area is being displayed in a superimposed manner in the region corresponding to the specified direction, the display control unit 234 determines whether an operation to delete the object data is received. Further, the display control unit 234 displays the object data in a superimposed manner based on the input display information. The processing described above is similar to the processing performed by the display control unit 133 of the first embodiment and therefore description thereof is omitted. The processing performed by the display control unit 234 when a termination instruction is received or the AR application is stopped is also similar to the processing performed by the display control unit 133 of the first embodiment and therefore description thereof is omitted.

Figure 11:
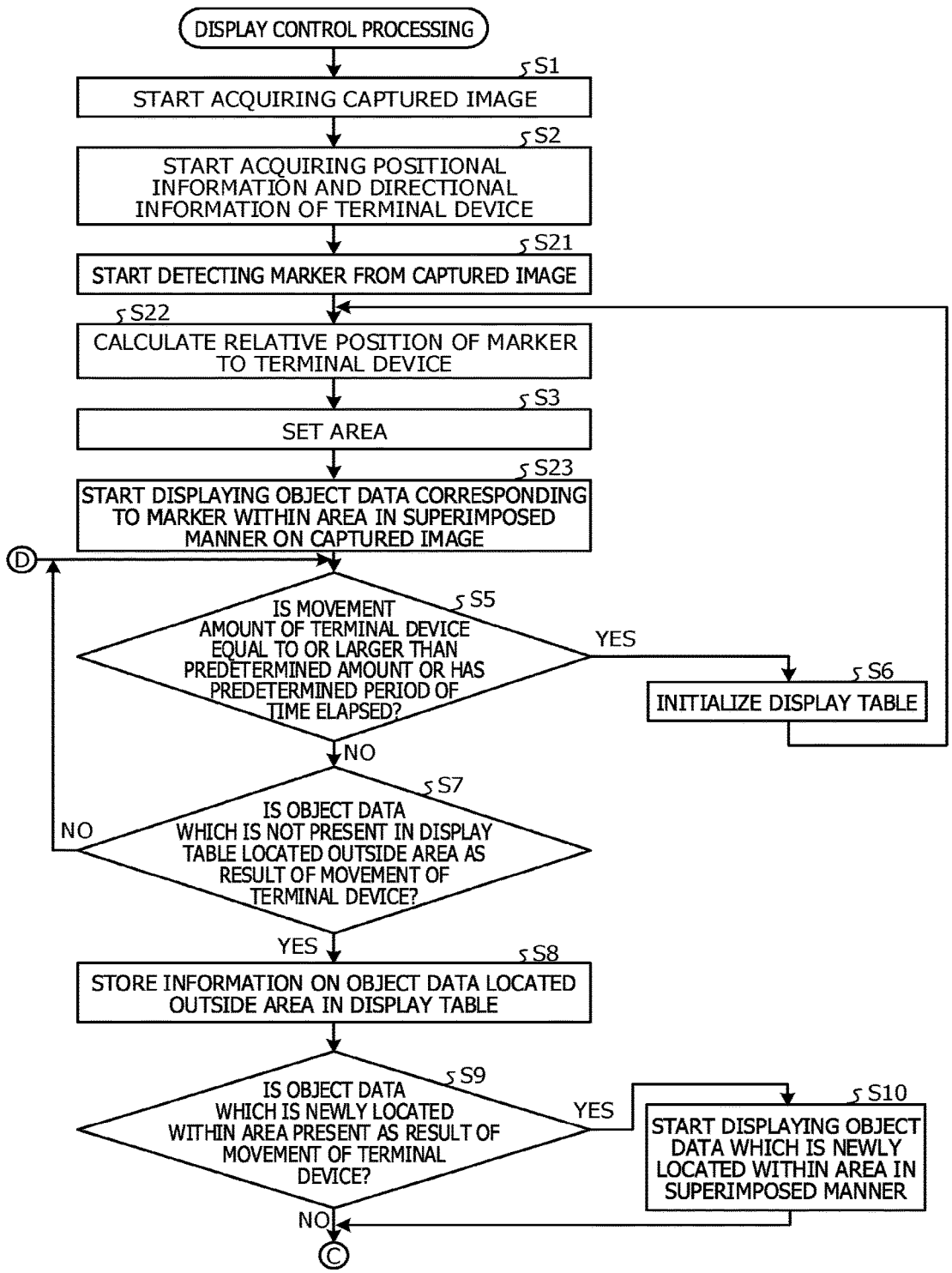
FIG. 11 is a flowchart illustrating an example of display control processing of the second embodiment.
Figure 12:
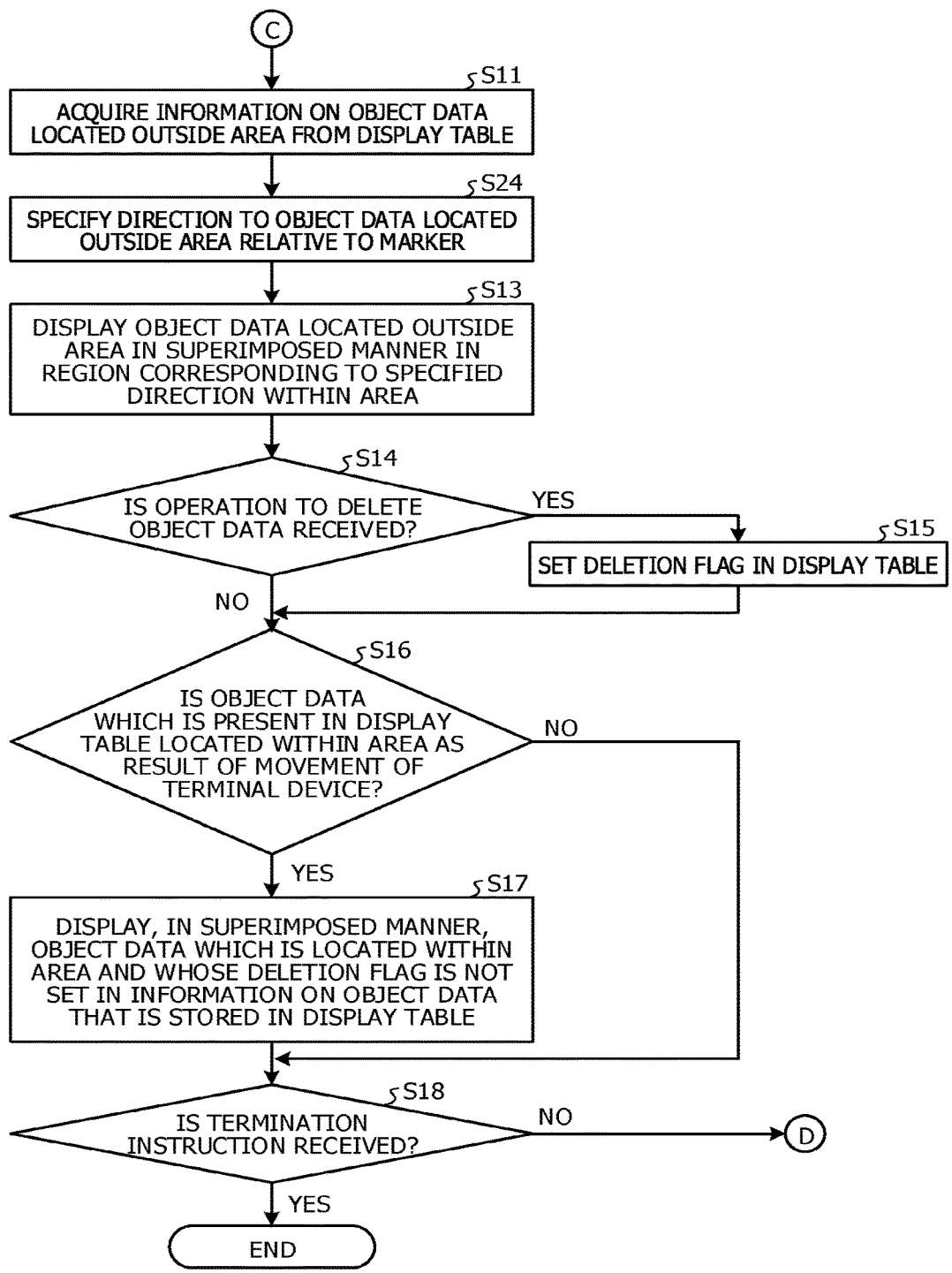
FIG. 12 is a flowchart illustrating the example of the display control processing of the second embodiment.

Next, the operation of the terminal device 200 of the second embodiment is described. FIG. 11 and FIG. 12 are flowcharts illustrating an example of the display control processing of the second embodiment.

When an AR application is activated, the detection unit 231 of the terminal device 200 starts acquiring a captured image from the camera 113 (Step S1). Further, the detection unit 231 starts acquiring positional information and directional information of the terminal device 200 (Step S2). When the detection unit 231 has started acquiring a captured image, the detection unit 231 starts detecting a marker from the captured image (Step S21). The detection unit 231 outputs information on the detected marker to the calculation unit 232. Further, the detection unit 231 outputs the positional information and the directional information to the display control unit 234.

When the information on the marker is input from the detection unit 231, the calculation unit 232 calculates a relative position of the detected marker to the terminal device 200 based on the information on the marker (Step S22). The calculation unit 232 refers to the object data storage unit 221 and acquires an object ID of the object data corresponding to the marker based on the information on the marker. The calculation unit 232 outputs the object ID and the calculated relative position to the specifying unit 233.

The object ID, the positional information, and the directional information are input from the detection unit 231 to the display control unit 234. The display control unit 234 sets the area that is the display area based on the input positional information and the input directional information (Step S3) and outputs the set area to the detection unit 231 and the specifying unit 233 as area information.

When the area is set, the display control unit 234 refers to the object data storage unit 221 and starts displaying the object data corresponding to the marker within the area in a superimposed manner on the captured image based on the input object ID (Step S23).

When the user has moved the terminal device 200 afterwards, the terminal device 200 proceeds to the processing of Step S5. Similarly to the first embodiment, the terminal device 200 executes the processing of Step S5 to Step S11. In the second embodiment, the terminal device 200 proceeds to Step S22 after the processing of Step S6 has been executed. After the processing of Step S11 has been executed, the terminal device 200 executes the processing of Step S24. The specifying unit 233 specifies a direction to the object data located outside the area relative to the marker based on the object ID, the relative position, the area information, and the acquired information on the object data located outside the area (Step S24). The specifying unit 233 outputs, to the display control unit 234, coordinates within the area corresponding to the specified direction.

Subsequently to the processing of Step S24, the terminal device 200 executes the processing of Step S13 to Step S18 similarly to the first embodiment. Thus, the terminal device 200 may provide a screen which allows the user to easily grasp the position of object data. Further, the user may view the object data which has been displayed once while the terminal device 200 has been moved to a position where the user may clearly view the object data, and thus the terminal device 200 may improve visibility and operability. Still further, once unwanted object data is deleted, the terminal device 200 does not display the deleted object data when the terminal device 200 is oriented toward the same object again. Thus, the user may view only desired information left on the screen, thereby easily selecting information to be displayed. Still further, the terminal device 200 may collectively display, on a single screen, not only the object data located within the image capture range but also the object data located outside the image capture range. Thus, the clarity of information display may be improved.

As described above, the terminal device 200 causes the display operation unit 111 to display object data associated with a reference object within the area corresponding to the position and orientation of the terminal device 200. Specifically, the terminal device 200 detects a reference object from an image captured by the camera 113 provided in the terminal device 200. The terminal device 200 calculates a relative position of the reference object to the terminal device 200 based on the detected reference object. When the position and orientation of the terminal device 200 are changed, the terminal device 200 specifies a direction to the detected reference object relative to the terminal device 200 based on the calculated relative position of the reference object to the terminal device 200. The terminal device 200 displays the object data corresponding to the detected reference object in a region corresponding to the specified direction within the display area of the display operation unit 111. As a result, the position of the object data may easily be grasped.

In the embodiments described above, a screen including superimposed display of object data is displayed on the display operation unit 111, but the embodiments are not limited thereto. For example, a head mounted display (HMD) may be connected to the terminal device 100 or 200 so as to display a screen on the HMD, and the setting of the area that is the display area or other operations may be performed based on information from a position detection sensor provided in the HMD.

The constituent elements of the respective units illustrated in the drawings may physically be configured in a way other than in the drawings. That is, the specific mode of distribution and integration of the respective units is not limited to the mode illustrated in the drawings and all or part thereof may functionally or physically be distributed or integrated in arbitrary units in accordance with various loads, usage, and the like. For example, the first specifying unit 131 and the second specifying unit 132 may be integrated with each other. The order of the processing steps illustrated in the drawings is not limited to the order described above. The processing steps may be executed simultaneously or the order of the processing steps to be executed may be changed without contradiction in the processing details.

All or arbitrary part of various processing functions to be executed by the respective devices may be executed on a CPU (or a microcomputer such as an MPU or a micro controller unit (MCU)). As a matter of course, all or arbitrary part of the various processing functions may be executed on a program analyzed and executed by the CPU (or a microcomputer such as an MPU or an MCU) or on hardware with wired logic.

Figure 13:
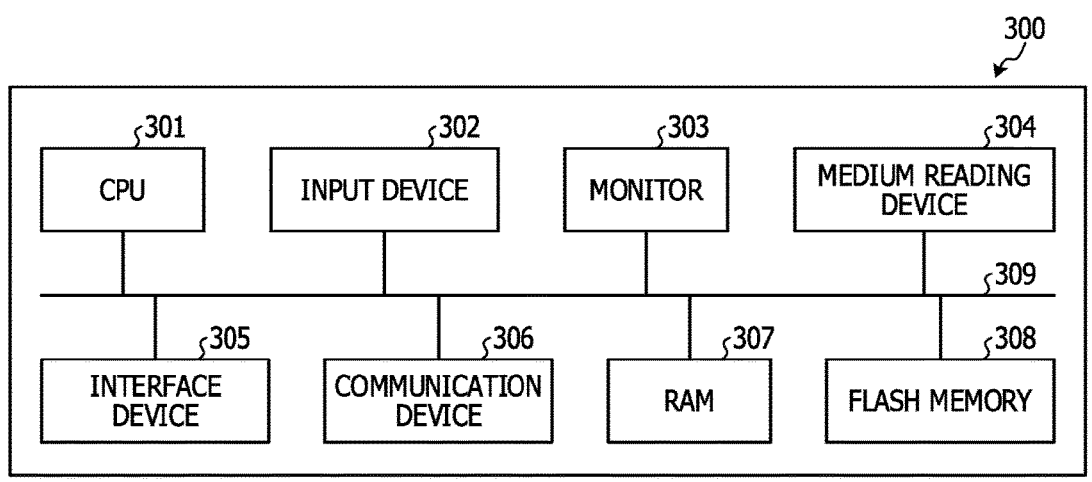
FIG. 13 is a diagram illustrating an example of a computer configured to execute a display control program.

Various kinds of processing described in the embodiments above may be implemented by causing a computer to execute a program prepared in advance. An example of a computer configured to execute a program having functions similar to those of the embodiments described above is described below. FIG. 13 is a diagram illustrating an example of a computer 300 configured to execute a display control program.

As illustrated in FIG. 13, the computer 300 includes a CPU 301 configured to execute various kinds of arithmetic processing, an input device 302 configured to receive data inputs, and a monitor 303. Further, the computer 300 includes a medium reading device 304 configured to read a program and the like from a storage medium, an interface device 305 for connection to various devices, and a communication device 306 for connection to other information processing devices and the like by wire or wireless. Further, the computer 300 includes a RAM 307 configured to temporarily store various kinds of information, and a flash memory 308. The respective devices 301 to 308 are connected to a bus 309.

The flash memory 308 stores a display control program having functions similar to those of the processing units including the first specifying unit 131, the second specifying unit 132, and the display control unit 133 illustrated in FIG. 1. The flash memory 308 may store a display control program having functions similar to those of the processing units including the detection unit 231, the calculation unit 232, the specifying unit 233, and the display control unit 234 illustrated in FIG. 10. Further, the flash memory 308 stores various kinds of data for implementing the object data storage unit 121 or 221, the display table storage unit 122, and the display control program. The input device 302 receives, for example, an input of various kinds of information such as operation information from a user of the computer 300. The monitor 303 displays, for example, various kinds of screen such as a display screen for the user of the computer 300. For example, headphones are connected to the interface device 305. For example, the communication device 306 has functions similar to those of the communication unit 110 illustrated in FIG. 1 or FIG. 10 and is connected to a server device (not illustrated) to exchange various kinds of information with the server device.

The CPU 301 performs various kinds of processing by reading each program stored in the flash memory 308, loading the program on the RAM 307, and executing the program. The program allows the computer 300 to function as the first specifying unit 131, the second specifying unit 132, and the display control unit 133 illustrated in FIG. 1. Alternatively, the program allows the computer 300 to function as the detection unit 231, the calculation unit 232, the specifying unit 233, and the display control unit 234 illustrated in FIG. 10.

The display control program described above may be stored in a storage device other than the flash memory 308. For example, the computer 300 may read and execute the program stored in a storage medium which is readable by the computer 300. The storage medium which is readable by the computer 300 corresponds to, for example, a portable recording medium such as a CD-ROM, a DVD, or a universal serial bus (USB) memory, a semiconductor memory such as a flash memory, and a hard disk drive. The display control program may be stored in a device connected to a public network, the Internet, a LAN, or the like, and the computer 300 may read the display control program from the device and execute the read display control program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer, the method comprising:
    capturing a first image;
    specifying a first position and a first orientation of a terminal device;
    controlling a display to display an object based on the first position, the first orientation and a first arrangement position of the object when the first arrangement position is inside a first area included in the first image;
    capturing a second image;
    specifying a second position and a second orientation of the terminal device;
    detecting that the first arrangement position of the object is outside of a second area included in the second image;
    specifying an object direction of the first arrangement position relative to the second position and the second orientation of the terminal device; and
    controlling the display to display the object in a second arrangement position in accordance with the object direction, the second arrangement position being inside the second area.

2. The method according to claim 1, wherein the object is an augmented reality (AR) object.

3. The method according to claim 1, wherein
    the terminal device is a head mounted display, and
    the first area and the second area are regions corresponding to a visual field of a user wearing the head mounted display at timings of capturing the first image and the second image, respectively.

4. The method according to claim 1, wherein
    the terminal device is held by a hand of a user, and
    the object is displayed on each of the first image and the second image.

5. A method executed by a computer, the method comprising:
- specifying object data and first arrangement position of the object data by referring to correspondence information of the object data and the first arrangement position of the object data when the first arrangement position is outside of a first image;
- specifying a direction of the first arrangement position relative to a terminal device based on the first arrangement position, a position of the terminal device, and an orientation of the terminal device;
- displaying the object data in a second arrangement position on the first image in accordance with the direction; and
- denying, in response to receiving an instruction to stop displaying of the object data after displaying the object data in the second arrangement position on the first image, display of the object data in the first arrangement position on a second image which is different from the first image when acquiring the second image in which the first arrangement position is included.

6. The method according to claim 5, further comprising: acquiring the first image, the first image being captured by a camera.

7. The method according to claim 5, further comprising:
- specifying the object data and the first arrangement position by referring to the correspondence information when the first arrangement position is inside of the second image;
- and displaying the object data in the first arrangement position on the second image.

8. The method according to claim 7, wherein the displaying of the object data in the first arrangement position is performed in a same manner of the displaying of the object data in the second arrangement position.

9. A device, comprising:
a memory; and
a processor coupled to the memory and configured to:
- capture a first image;
- specify a first position and a first orientation of the device;
- control a display to display an object based on the first position, the first orientation and a first arrangement position of the object when the first arrangement position is inside a first area included in the first image;
- capture a second image;
- specify a second position and a second orientation of the device;
- detect that the first arrangement position of the object is outside of a second area included in the second image;
- specify an object direction of the first arrangement position relative to the second position and the second orientation of the device; and
- control the display to display the object in a second arrangement position in accordance with the object direction, the second arrangement position being inside the second area.

10. The device according to claim 9, wherein the object is an augmented reality (AR) object.

11. The device according to claim 9, wherein
the device is a head mounted display, and
the first area and the second area are regions corresponding to a visual field of a user wearing the head mounted display at timings of capturing the first image and the second images respectively.

12. The device according to claim 9, wherein
the device is held by a hand of a user, and
the object is displayed on each of the first image and the second image.

* * * * *